July 20, 1943.  L. E. ABBOTT ET AL  2,324,809
SOLDERING METHOD
Filed July 22, 1942  3 Sheets-Sheet 1

INVENTORS L. E. ABBOTT
W. W. WERRING
BY
ATTORNEY

July 20, 1943.　　　L. E. ABBOTT ET AL　　　2,324,809
SOLDERING METHOD
Filed July 22, 1942　　　3 Sheets-Sheet 3

INVENTORS: L. E. ABBOTT
W. W. WERRING
BY John Axtall
ATTORNEY

Patented July 20, 1943

2,324,809

UNITED STATES PATENT OFFICE 2,324,809

SOLDERING METHOD

Lester E. Abbott, Valley Stream, and Walter W. Werring, Brooklyn, N. Y., assignors to Bell Telephone Laboratories, Incorporated, New York, N. Y., a corporation of New York Application July 22, 1942, Serial No. 451,928

7 Claims. (Cl. 219—12)

This invention relates to manufacturing methods and particularly to methods of fabricating electrical apparatus.

The object of the invention is to provide a method of soldering a large number of connections by machine.

A substantial portion of the cost of numerous communication apparatus assemblies is represented by the cost of the manual labor in soldering of the multiple connections which must be made. Such connections often run into the hundreds for each piece of apparatus and so where there are large numbers of units alike a substantial saving can be made by using automatic or machine methods.

According to one embodiment of the invention wire straps which are to be soldered at regular intervals to apparatus terminals are prepared to have a short length thereof corresponding to the position at which a connection will be made, of increased resistance. Each such short length is then further prepared by having a sufficient quantity of solder and soldering flux deposited thereon. Such prepared straps are then placed in contact with the apparatus terminals and a current passed therethrough of sufficient density to melt the solder and establish a good mechanical and electrical connection with the adjacent terminal. By having these short lengths of higher resistance, the heating is concentrated at the proper points and the remainder of the strap is not deformed by undue heating.

A feature of the invention is a conductor having a short length therein of increased resistance whereby such short length will be heated to a higher degree than the remainder of the conductor by the passage of current therethrough.

Another feature of the invention is a means for simultaneously raising the temperature of a plurality of short portions of an electrical conductor for the purpose of melting drops of solder thereat by the passage of current therethrough.

Another feature of the invention is a jig for holding a plurality of electrical conductors, simultaneously passing currents therethrough and for pressing heated portions of said conductors into properly formed recesses of the terminals to which said conductors are to be wired.

Another feature of the invention is a method of soldering a wire to a terminal which consists of reducing the cross section of the wire at the point where the soldered connection is to be made, bringing such point adjacent the terminal in the presence of a sufficient amount of solder and passing a current through said wire for a period sufficient to raise said point of reduced cross section in temperature to melt said solder.

Other features will appear hereinafter.

The drawings consist of three sheets having five figures as follows.

Figure 1:
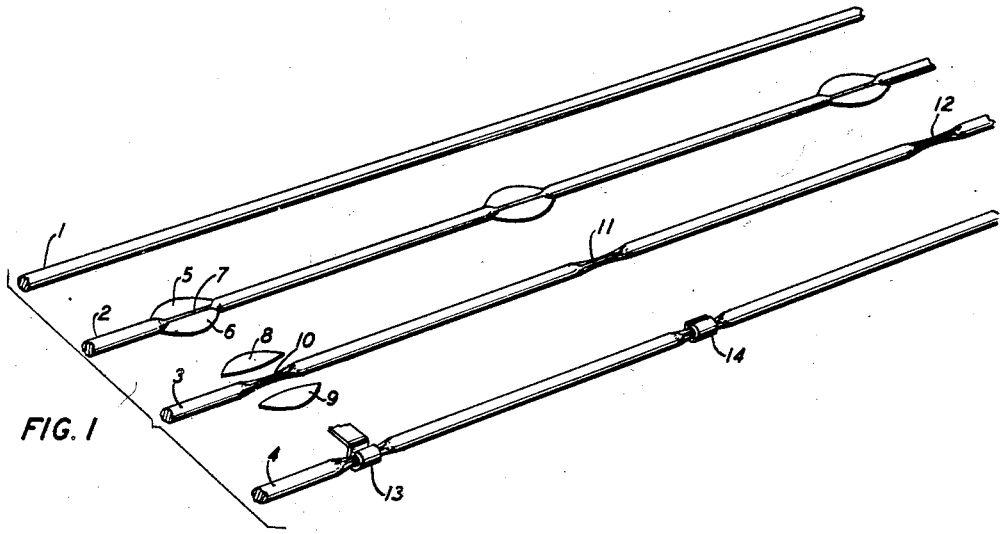
Fig. 1 is a perspective drawing showing four conductors in various stages of preparation for the multiple soldering operation.

Fig. 1 shows short lengths of four conductors 1, 2, 3 and 4 representing a conductor in various stages of preparation for the soldering operation. Conductor 1 is a conductor in its untouched state where the cross section throughout its length is uniform and therefore each unit length thereof is of the same resistance. Conductor 2 represents the same conductor after an operation in which certain portions at regular and appropriate points have been swaged or flattened as a first step in reducing the cross section thereat. This swaging operation results in the formation of a pair of ears 5 and 6, by way of example, extending from each side of an axially located portion 7 of smaller diameter. The next step is shown in connection with conductor 3, where the ears 8 and 9 at one soldering point are indicated as having been clipped off in any appropriate manner. This conductor is then shown as having three short sections 10, 11 and 12 of decreased diameter. Conductor 4 represents the last stage in the preparation of the conductor. Here a small piece of solder 13 in the form of a thin ribbon is being wrapped about one of these prepared sections. The solder 14, at another section represents the completed operation. Such points may then be sprayed or washed with a flux-bearing solution such as rosin dissolved in alcohol.

It will be understood that this method of preparation is given only as an example of one way in which the desired result may be obtained, and that it is merely illustrative of a method which may be broadly stated as preparing a conductor for a soldering operation by first forming a point of comparatively high resistance therein and then placing an appropriate amount of solder at such point. It will further be understood that the preparation of such conductors may be carried out in any manner such as by hand or by machine operations. It will be recognized that the preparation of conductors in this manner will result in the economical use of solder as the exact amount necessary may be easily determined and wastage avoided.

Figure 2:
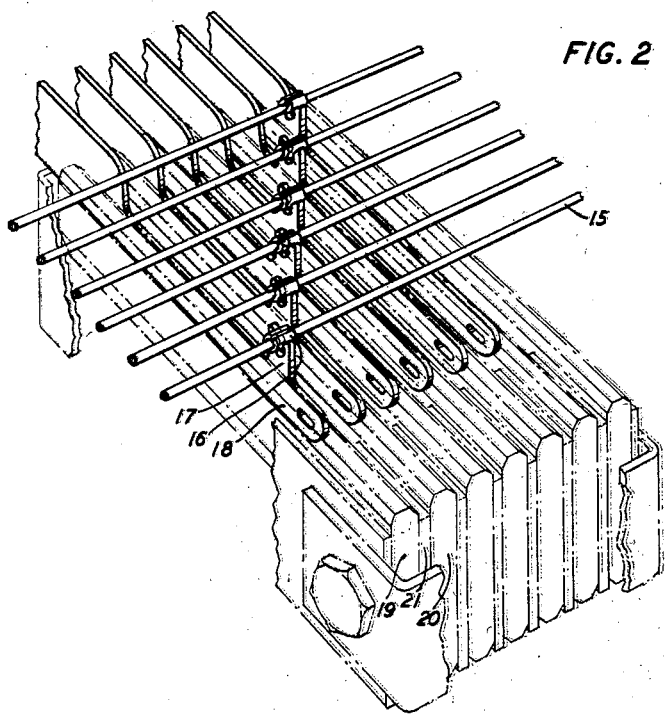
Fig. 2 is a fragmentary perspective view of a number of prepared conductors placed in cooperative relationship with the lugs of the apparatus terminals to which they will be soldered.

Fig. 2 indicates the next main step in the method of the present invention. Here for instance a conductor 15 is so placed that a prepared section 16 thereof is placed within the jaws of a soldering lug 17 of a terminal piece 18. Thereafter when an appropriate current is passed longitudinally through the conductor 15, the prepared section 16 becomes hot enough to melt the solder and permanently join the conductor 15 electrically to the lug 17 of terminal 18.

In this view six wires such as 15 are shown placed in cooperative relationship with an equal number of lugs on an equal number of terminals. Since longitudinal currents may be sent simultaneously through these wires, six soldered joints may be made simultaneously. Where each wire has a plurality of such prepared sections each wire may be soldered simultaneously to an equal number of terminals. Thus if wire 15 has ten prepared sections such as 16 it will be appreciated that sixty soldered joints may be made simultaneously.

In this figure there is also shown in broken-line outline, part of a jig which may be used to hold the terminals during the soldering operation. Thus the terminal 18 may be firmly held between two pieces of insulation 19 and 20, the insulating spacer 21 being of substantially the same thickness as the terminal 18.

Figure 3:
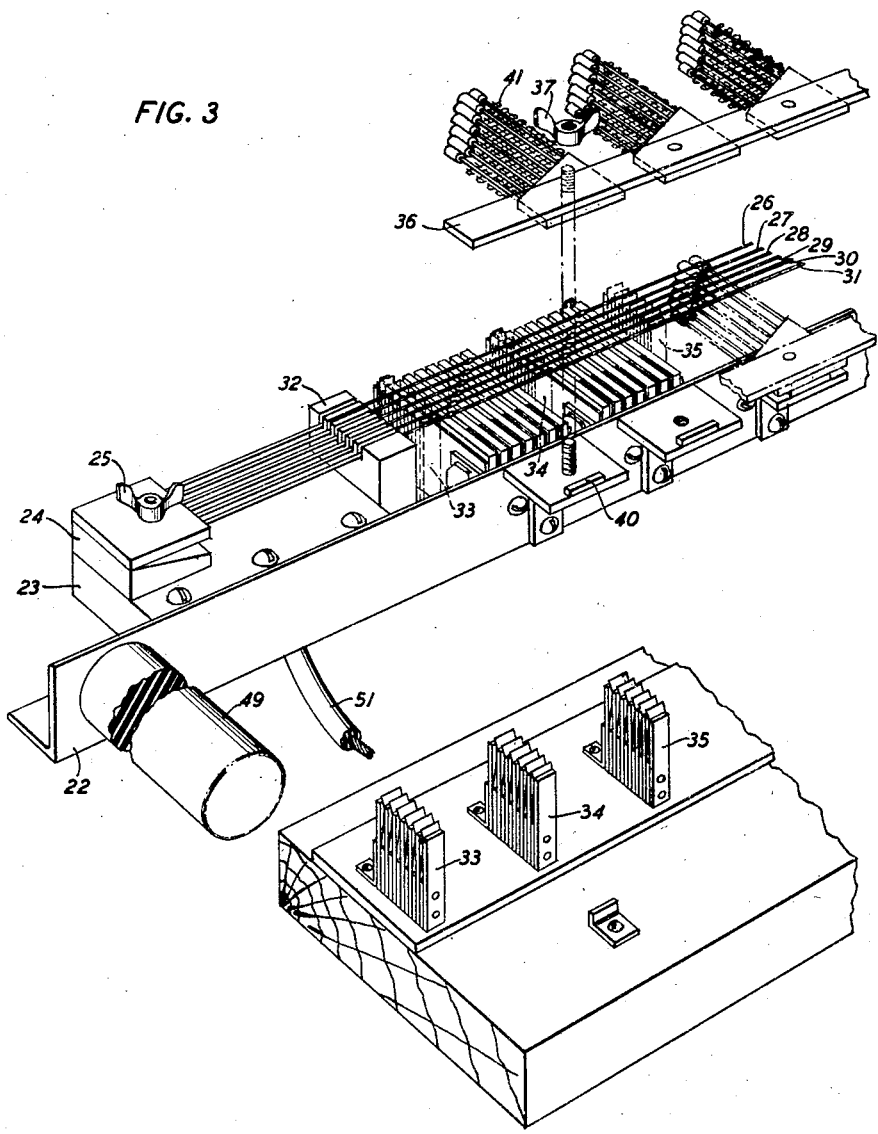
Fig. 3 is an exploded fragmentary perspective drawing of the jig used in holding the conductors in place during the soldering operation.

Fig. 3 shows an exploded view of the various elements of a jig used in making sixty soldered connections simultaneously. It consists essentially of a base part formed of an angle-iron 22 to which the other components are secured. Thus at either end there is a block of insulation such as 23 to which a terminal clamp 24 is attached. The six conductors 26 to 31 are placed in the clamp 24 and secured by a thumb-nut 25. The proper spacing of the wires is insured at either end of the jig by grooves in the block such as 32. At intermediate points grooved guides shown by the assemblies 33, 34 and 35 help to maintain the alignment of the conductors 26 to 31.

At regular and appropriate intervals there are attached to the base part 22, assemblies of guides such as that indicated in Fig. 2 so that the prepared sections of the conductors are brought into proper cooperative relationship with the terminal lugs. When this alignment has been properly made, then a strip 36 carrying an appropriate number of assemblies of resilient springs each tipped with fingers of ceramic material is secured to the member 22 by lock-nuts 37, 38 and 39. These resilient springs may then be caused to exert considerable pressure against the wires due to their suspension whereby their ceramic-tipped fingers rest on such wires while the other end of the assembly rests on a block such as 40 and pressure is exerted at an intermediate point.

A piece of insulating fabric is interposed between the springs and the wires so that no unwanted connections will be formed during the soldering operation.

Figure 4:
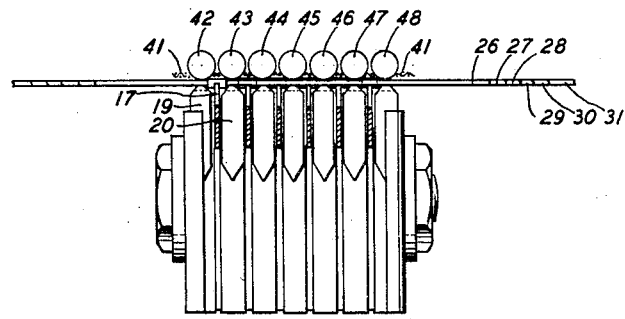
Fig. 4 is a fragmentary end view of the conductors in the jig awaiting the soldering operation showing how two ceramic-tipped fingers press the conductors against the lugs from either side thereof during the soldering operation.

Attention is drawn to Fig. 4, which shows the seven ceramic-tipped fingers 42 to 48 of a pressure spring assembly. These are so placed that the fingers 42 and 43 bear on conductor 26 at either side of a prepared section, fingers 43 and 44 bear on conductor 27 at either side of a prepared section, and so forth, so that when the solder is melted the conductors will be gently forced into proper cooperative relationship with the appropriate terminal lugs.

Figure 5:
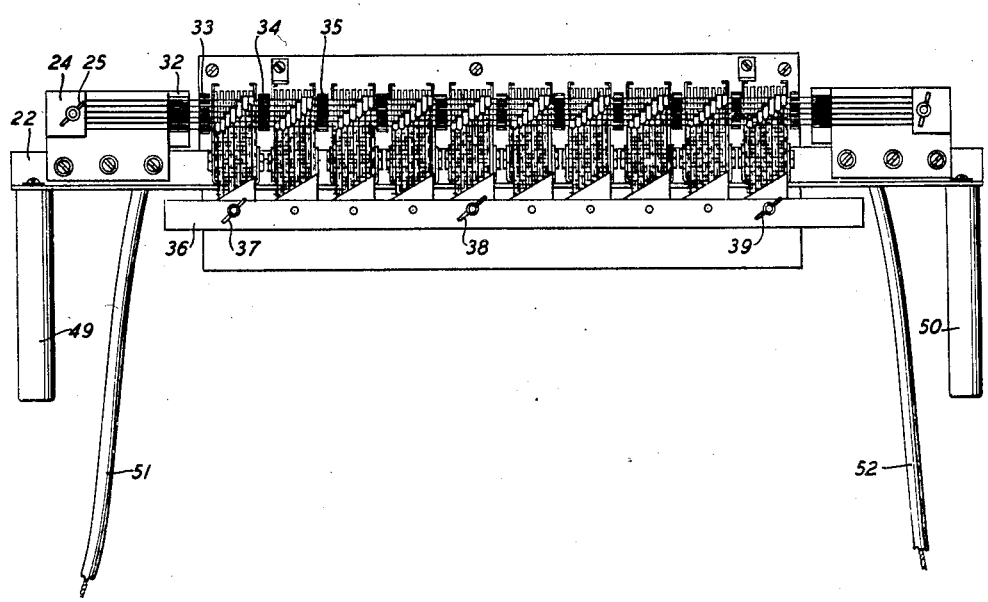
Fig. 5 is a top view showing the jig assembled and in position during the soldering operation.

Fig. 5 shows the jig, which may be moved by handles 49 and 50, completely in place. Thereupon the conductors 51 and 52, connected to the terminal blocks such as 24 are connected to an appropriate source of current whereby currents of proper intensity are passed longitudinally through the conductors 26 to 31 for a predetermined period. The prepared sections are heated, the solder placed thereat is melted and appropriate electrical connections are formed simultaneously.

What is claimed is:

1. The method of soldering a metallic wire to a metallic terminal which consists in increasing the electrical resistance of the wire at the point where the soldered connection is to be made, bringing the said high resistance point in the wire into position next to said terminal in the presence of a small quantity of solder and passing an electrical current longitudinally through said wire of sufficient density over a predetermined period to raise the temperature of said high resistance point to the melting point of said solder.

2. The method of soldering a metallic wire to a metallic terminal which consists in reducing the cross section of said wire at the point where the soldered connection is to be made, wrapping a small quantity of solder about said wire at the point of reduced cross section, bringing said wire and terminal together in proper cooperative position and passing an electrical current longitudinally through said wire of sufficient density over a predetermined period to raise the temperature of said point of reduced cross section to the melting point of said solder.

3. The method of simultaneously soldering a metallic wire to a metallic plurality of terminals which consists in forming electrical high resistance points in said wire at the points where said wire is to be soldered to said terminals, affixing a quantity of solder to said wire at each of said high resistance points, placing said wire in position with each said high resistance point contiguous to one of said terminals and passing a predetermined current for a predetermined time longitudinally through said wire whereby said quantities of solder are melted and electrical connections are formed to said terminals.

4. The method of simultaneously soldering a metallic plurality of wires each to a metallic plurality of terminals which consists in forming electrical high resistance points in said wires at the points where said wires are to be soldered to said terminals, affixing a quantity of solder to said wires at each of said high resistance points, placing said wires in position with each said high resistance point contiguous to one of said terminals, and simultaneously passing a predetermined current for a predetermined time longitudinally through each of said wires whereby said quantities of solder are melted and electrical connections are formed between said wires and said terminals.

5. The method of simultaneously soldering a metallic plurality of wires each to a metallic plurality of terminals which consists in forming electrical high resistance points in said wires at the points where said wires are to be soldered to said terminals, affixing a quantity of solder to said wires at each of said high resistance points, placing said wires in position with each said high resistance point contiguous to one of said terminals, pressing each said high resistance point toward said contiguous terminal and simultaneously passing a predetermined current for a predetermined time longitudinally through each of said wires whereby said quantities of solder are melted and electrical connections are formed between said wires and said terminals.

6. The method of soldering a metallic wire to a metallic terminal which consists in preparing a soldering point on said wire at the point where the soldered connection is to be made by squeezing the wire at said point, clipping off squeezed-out portions thereof, wrapping said point with a short length solder with a solution of alcohol and rosin, bringing said prepared point into position next to said terminal, passing a predetermined current for a predetermined period of time longitudinally through said wire and pressing said prepared point against said terminal whereby said solder is melted and an electrical connection is formed between said wire and said terminal.

7. The method of soldering a metallic wire to a metallic terminal which consists in increasing the electrical resistance of the wire at the point where the soldered connection is to be made, bringing the said high resistance point in the said wire into position next to said terminal in the presence of a small quantity of solder and passing an electrical current longitudinally through said wire in amount sufficient to raise the temperature of the said high resistance point to the melting point of said solder but insufficient to overheat the remaining portions of said wire whereby bending distortion and displacement of the said wire are avoided.

LESTER E. ABBOTT.
WALTER W. WERRING.